United States Patent [19]

Kaufman, Sr.

[11] 4,148,300
[45] Apr. 10, 1979

[54] SOLAR RADIATION ENERGY CONCENTRATOR

[76] Inventor: Larry L. Kaufman, Sr., 9880 N. Hawkins Hwy., Brooklyn, Mich. 49230

[21] Appl. No.: 829,986

[22] Filed: Sep. 1, 1977

[51] Int. Cl.² ............................................. F24J 3/02
[52] U.S. Cl. ................................................. 126/271
[58] Field of Search ....................................... 126/271

[56] References Cited

U.S. PATENT DOCUMENTS

| 1,683,266 | 9/1928 | Shipman | 126/271 |
| 1,951,403 | 3/1934 | Goddard | 126/271 |
| 1,969,839 | 8/1934 | Goddard | 126/271 |
| 2,552,237 | 5/1951 | Trombe | 126/271 |
| 3,927,659 | 12/1975 | Blake et al. | 126/271 |
| 4,029,077 | 6/1977 | Gorniak | 126/271 |
| 4,069,812 | 1/1978 | O'Neill | 126/270 |

FOREIGN PATENT DOCUMENTS

| 547475 | 8/1956 | Italy | 126/271 |
| 929316 | 6/1963 | United Kingdom | 126/271 |

Primary Examiner—Carroll B. Dority, Jr.

[57] ABSTRACT

A solar radiation energy concentrator adapted to convert solar radiation into useful forms of energy, comprising a base member with a longitudinally extending hollow chamber, said chamber having an open end therein for admission of solar radiation therethrough; integrally affixed in said open end is a convex glass magnifying lens adapted to receive solar radiation impinging thereon and focus said radiation into a concentrated area on a heat absorbing sensor device located adjacent in that end of said chamber distal from the open end. The concentrator includes a heat exchanging system integrally juxtaposed with refractory lining on the chamber wall, for delivery of the energy input into the designated system.

3 Claims, 6 Drawing Figures

SOLAR RADIATION ENERGY CONCENTRATOR

DISCUSSION OF PRIOR ART

With the impending energy crisis now facing man, the necessity and reality of using variant forms of energy to produce electricity, heat, and other needs is imperative. Consequently, with the projected reduced availability of fossil fuels, particularly petroleum, there has been renewed emphasis on such diverse energy forms as wind, the sun and hydroelectric power, among others. In this regard, solar power devices of various types, while certainly not new in basic concept, have been conceived in various embodiments to achieve maximal utilization of the sun's radiation energy. Similarly, this invention relates to an improved solar energy converter.

Basic to any comprehension of a solar heater is an understanding of solar energy itself. Solar energy is electromagnetic radiation which travels 186,000 miles per second and occupies the spectrum from about 0.25 micron to 3.0 microns in wavelength. About nine percent of this lies in the extremely short, and invisible, ultraviolet region; about forty percent is the visible light factor; and the remaining fifty one percent is infrared, or the long waves. The latter comprises the most significant energy factor in the radiation process. This electromagnetic energy is the end result of the process of fusion of hydrogen into helium, whereby the sun is continuously converting its substance into radiant energy. Moreover, this process takes place within the sun's interior at a temperature estimated at thirty million degrees Farenheit, however the surface of the sun has a temperature of approximately 10,000 degrees Farenheit only. However, to appreciate the scope and perspective of each such a temperature as ten thousand degrees Farenheit, it must be noted that man has only been able to generate such high temperatures using sophisticated techniques as electrical plasma generation and shock tubes.

As a direct result of the sun's fusion an appreciable amount of this radiant energy falls on the earth. In this respect, the average amount of the sun energy reaching the Earth's atmosphere, amounts to two calories per square centimeter per minute, the mean value of the solar constant is 1.395 kilowatts per square meter. The total radiation continuously intercepted by the Earth (an area of $1.273 \times 10^{14}$ square meters) is $1.73 \times 10^{17}$ watts. This is approximately 173 trillion kilowatts, or 232 trillion horsepower continuously received. However, somewhere around thirty percent of the solar energy reaching the Earth's atmosphere is immediately reflected back into space as short-wave radiation. Approximately forty seven percent is absorbed by the atmosphere, the land, and the oceans to contribute to the temperature of the environment, and this serves as the potential useful component for solar energy conversion.

For a perspective of total solar energy received, it must be noted that solar radiation intercepted at the outer atmosphere of Earth has an energy content estimated at 5,300 Q per year, where Q= 1 billion$^2$ B.T.U.'s of energy. This is equivalent of more than 200 trillion short tons of bituminous coal. Every hour the sun showers the Earth with about 0.6 Q, and thus in a day the input is more than 14 Q, and in less than three days the earth theoretically receives as much as some estimates of total fossil fuels remaining on Earth. Moreover, in forty days the Earth receives sufficient solar energy to last a century at present needs; the only problem is that of effectively harnessing such energy into useful forms. Of course, these values and estimates are theoretical maximums, and as such they are only approached under ideal conditions when the air is clear. Interference from such things as clouds, haze, dust, and smog obviously reduces the amount of solar energy received, and of course are important considerations in this harnessing process and the efficiency thereof.

The foregoing data, set forth as background is obviously indicative of the vast potential of the solar radiation as an energy source. The enigma and paradox is that while this energy source has been omnipresent throughout the planet's history, it has not been effectively or successfully tapped. As set out in the following discussion, it is apparent that man is still in the embryonic stage of his potential for a more efficient adaptation to the use of the sun's energy. Indeed solar heaters and concentrators have been used and moreover many of these have been functional and successful to a limited or moderate degree. However, much progress is needed to improve existing solar heaters to a more efficient stage.

Clearly, efficiency then is the ultimate quest in solar heater development and the determining test for a solar heater or collector is how well it performs from a thermodynamic view. Efficiency is thus measured in terms of thermodynamics. In short, the inquiry for such performance is how many B.T.U.'s of usable heat energy for a given period for a given area does it yield, after subtracting uncontrollable factors. From a practical point of view, a collector's performance is basically a function of the temperature at which it operates. The latter performance is in effect its thermodynamic efficiency in converting and preserving the heat it obtains on its particular collecting surface. In this regard, the solar energy art has thus far been too much concerned with the collection efficiency and not enough attention has been given to the energy retention factor. This invention is concerned with both the collection and retention factor. This invention is concerned with both the collection and retention aspects of the thermodynamic process in solar energy conversion.

Relative to the problem of thermodynamic efficiency, there is an apparent paradox; the higher the temperature it operates at, the less efficient is the particular collector in many cases. In order to explain this apparent paradox, the question of collector losses must be ascertained and the rate of such losses, is determined by a factor called the "Delta-T" factor. Now, in regard to long-wave radiation losses, the Delta-T factor is obtained by subtracting the outside ambient temperatures, taking wind chill factors into account, and the temperature inside the collector. Thus, the higher the Delta-T factor, the more rapid the loss. Now at a certain point, within a given solar heater or collector, a level is achieved where stasis results. This stasis level is the point where energy losses moving upward and outward from the collector are equal to the input of heat energy. These losses appear to increase at higher temperatures, and all major types of solar heaters have this characteristic to a degree along with other difficulties. The following discussion of the basic types of solar heaters set forth these mentioned thermodynamic advantages and disadvantages of each type and will serve as a background for the thermodynamic basis of the subject invention.

Most of the solar energy collectors presently utilized in homes, and other similar applications, are of the type referred to as flat plate collectors. In this latter type a black plate is covered by a transparent cover plate, spaced a distance of a few inches above the plate, to allow transfer of the sun's radiation therethrough. The plate material for the absorbing function is usually aluminum painted black, and conventionally the sides and bottom of the container for the black surface are insulated with suitable materials. The black surface of the plate absorbs most of the sun's shortwave radiation and after being absorbed this energy is reradiated as longwave radiation. Since glass in the enclosure plate is opaque to longwave radiation, the latter is retained in the enclosure, thereby helping to retain and increase the total heat in the collector. In this type, the black plate, being a heat absorber as mentioned, collects heat and in turn heats a fluid, usually water, flowing immediately beneath its surface through an appropriate piping system. When the heat transfer medium used is water the system is called a hydronic system, if hot air, then it is referred to as a hot area system. In a hydronic system, the resultant hot water generated may be used directly for heating the building or it may be converted to electrical or other energy forms. Hot air can be used efficiently as a heating medium without further transformation. It is estimated that the efficiency range for such black plate collectors ranges from 40% to 60% for a thirty degree Farenheit temperature rise, and a thirty percent efficiency rating for a one hundred degree Farenheit temperature increase. Obviously, such efficiency ranges are not satisfactory in view of the fact that in certain areas sunlight does not cover the area much of the year. While specific devices have been used to improve these solar heaters they are still highly inefficient, in part from a heat retention perspective, and the art requires a more efficient and effective methodology of collecting, retaining, and utilizing solar radiation in order to economically and successfully rely on solar heat.

As opposed to the flat plate collectors, solar concentrators are used to harness solar radiation in a more concentrated form and such devices are especially useful to produce temperatures in excess of three hundred degrees Farenheit for relatively efficient electrical power generation and other applications in which high temperature heat is needed. For instance, such devices have been utilized to increase the power output of photovoltare cells in view of the heat generated. The most commonly used method of concentrating and focusing the sun's radiation is by way of reflector system, and for relatively high radiation concentration, the ideal structure for this purpose is a parabolic bowl. In such instances, the central longitudinal axis of the parabolic reflector must be directed at all times towards the sun. Further, in solar energy concentrators a heat exchanger is usually located at the focus of the collector, the focus being the focal point of the parabolic shape. Parabolic concentrators, because of the state of the art, are not used that frequently for most solar energy applications, particularly in those situations where the cost of collecting solar energy must remain low. Parabolic troughs are used as concentrators, although they do not have the same efficiency as parabolic bowl.

Another important facet of solar concentrators is that they produce hot zones in extremely limited areas, for instance the focus in most of the relatively larger solar furnaces ranges from one to two inches, although temperatures in the 100° to 4000° F. range have not been uncommon at these hot spots. It has been estimated that in order to produce a hot zone of around five inches diameter a parabolic bowl having a diameter of about 100 to 150 feet would be required. The relatively enormous size of such a parabolic collector clearly reduces its potential acceptability for most energy applications. By reason of the fact that the sun has an apparent diameter with an angle of approximately 0.009 radians, the ideal paraboloid will concentrate most of the sun's radiation on a spot with a diameter equal to the focal length times 0.009 radians. The concentration ratio C formed at the hot spot is found as the ratio of the solar radiation intensity on the hot spot to the unconcentrated direct sun's radiation intensity or intensity at the concentrator site, and thus $$C = \frac{Qf = \text{Solar radiation intensity at hot spot}}{Qi = \text{Unconcentrated direct solar radiation}}$$

Now for a perfectly formed paraboloid, the ratio is a direct function of the paraboloid rim angle $\theta$ and the angular diameter of the sun (a=0.009 radians)

$$C = \frac{4}{a^2} \sin^2 \theta ,$$

and Qf=solar radiation intensity at hot spot. Therefore, variation of the paraboloid shape and particularly the rim angle will determine the degree of concentration at the focal spot. The more finely drawn into a small size, the more heat will be concentrated, and thus the higher the temperature will be generated. The same principles would apply in a concentrated hot spot using a convex lens as a concentrating vehicle. In each case however, whether by paraboloid or by convex lens, the advantage of higher temperature realized is accomplished at the sacrifice of spreading the accumulated heat over a wide area. Another disadvantage with existing concentrators is that generally they are structured in such a way that the heat collected is not efficiently retained because of ambient air flows on ineffective structural locks to prevent heat losses.

As can be readily determined from the foregoing discussion of the prior art, it is not difficult to see the shortcomings of existing known solar energy devices from a practical economic standpoint. On the one hand, the flat plate collector is capable of absorbing radiant energy over a more widely dispersed area, at low temperature gradients, while on the other hand, solar concentrators yield at the expense of wide area dispersal, only moderate to moderately high temperature increases over just a limited area. Moreover, a real and significant problem of heat collection and retention characterizes the array of known solar heaters. While some may be efficient collectors, the retention problem is not solved, and vice versa. As a direct result of this latter observation, the need for more effective solar energy efficient solar heaters is most obvious, and the subject invention is thus directed to that end of a more efficient solar heater.

OBJECTS

In view of the foregoing discussion of the prior art the objects of the invention are:

It is an object of the subject invention to provide an improved solar heating device;

A further object of this invention is to provide an efficient solar energy concentrator;

It is yet another object of the subject invention to provide an improved method of utilizing and harnessing the maximum effect of solar radiation;

It is an object of the subject invention to provide a highly efficient solar heater;

An object of the subject invention is to minimize heat losses in a solar collector;

Another object of the subject invention is to provide an effective high temperature solar energy concentrator;

It is also an object of the subject invention to provide an improved method of retaining the heat in a solar collector;

Yet another object of the subject invention is to provide a method of magnifying the effect of solar energy into a higher temperature zone for maximization of the sun's radiant energy effect;

Still another object of the subject invention is to provide an improved device for maximizing the degree of concentration of the sun's energy;

It is an object of this application and the subject invention to set forth a novel and unique solar energy methodology;

An object of this invention is also to provide a solar energy converter which serves to multiply the radiant energy effect of the sun, concentrating same onto a heat collector for high temperature heat transfer application;

A still further object of the subject invention is to provide a solar furnace which maximizes the collection of heat energy;

Another object of the subject invention is to provide a solar heating device which maximizes the heat retention function;

Other and further objects will become apparent from the following drawings take in conjunction with the description of the preferred embodiment.

DRAWINGS

DESCRIPTION OF GENERAL EMBODIMENT

The subject invention is a solar heating and retention device used to magnify and thereby concentrate, and subsequently retain, to a maximal degree the energy of solar radiation into a relatively small area on a heat absorber whereon heat gradients are developed so as to yield temperatures up to five thousand degrees Farenheit or more. The invention is comprised of a longitudinally extending upright hollow reception chamber, with an open end which is exposed to the sun for admission of the sun's rays. Affixed in this opening is a conforming glass lens having a diameter which is sufficiently large in order that the outer circumference of the lens is substantially the same size as the inner circumferential area of the open end of the chamber. The chamber itself is in the form of an inverse truncated quadrahedron, wherein the inner diameter of the lower extremity is less than the diameter of the upper extremity. This latter configuration and the precise size and shape of the chamber is not of critical consequence, however, but as expressed in the following description serves as the most optimal shape. Located within the lower reaches of the chamber is a heat absorbing body connected to an appropriate heat exchanger system, located therein. The framework shield in which the chamber is located is comprised of an inner lining made of high quality refractory material, while the intermediate lining is made of a low temperature insulating material. A metal cover encompasses the outer shield and jacket.

DESCRIPTION OF PREFERRED EMBODIMENTS

Figure 1:
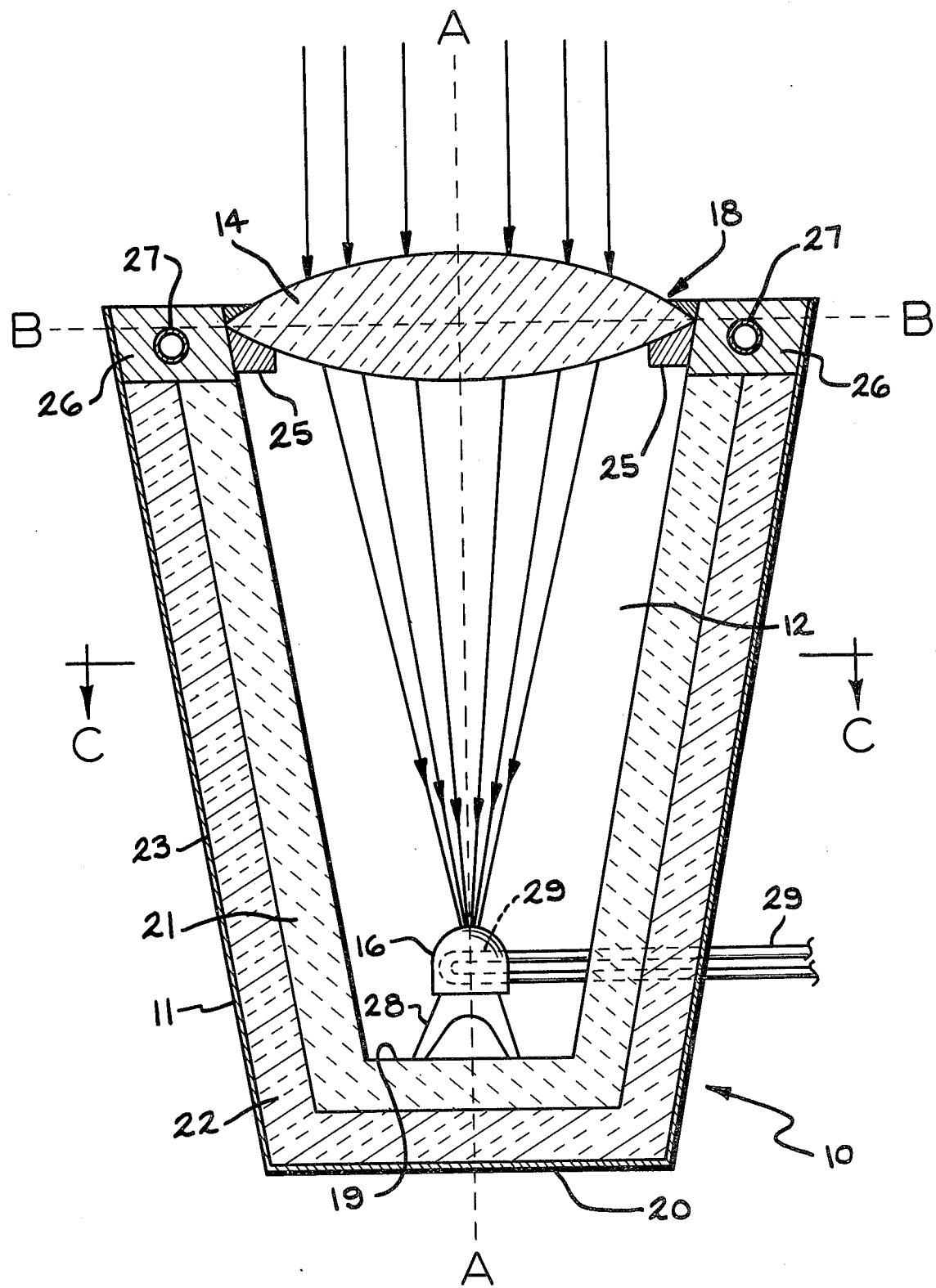
FIG. 1 is a elevational view from the side, in section of a preferred embodiment of the subject invention.
Figure 2:
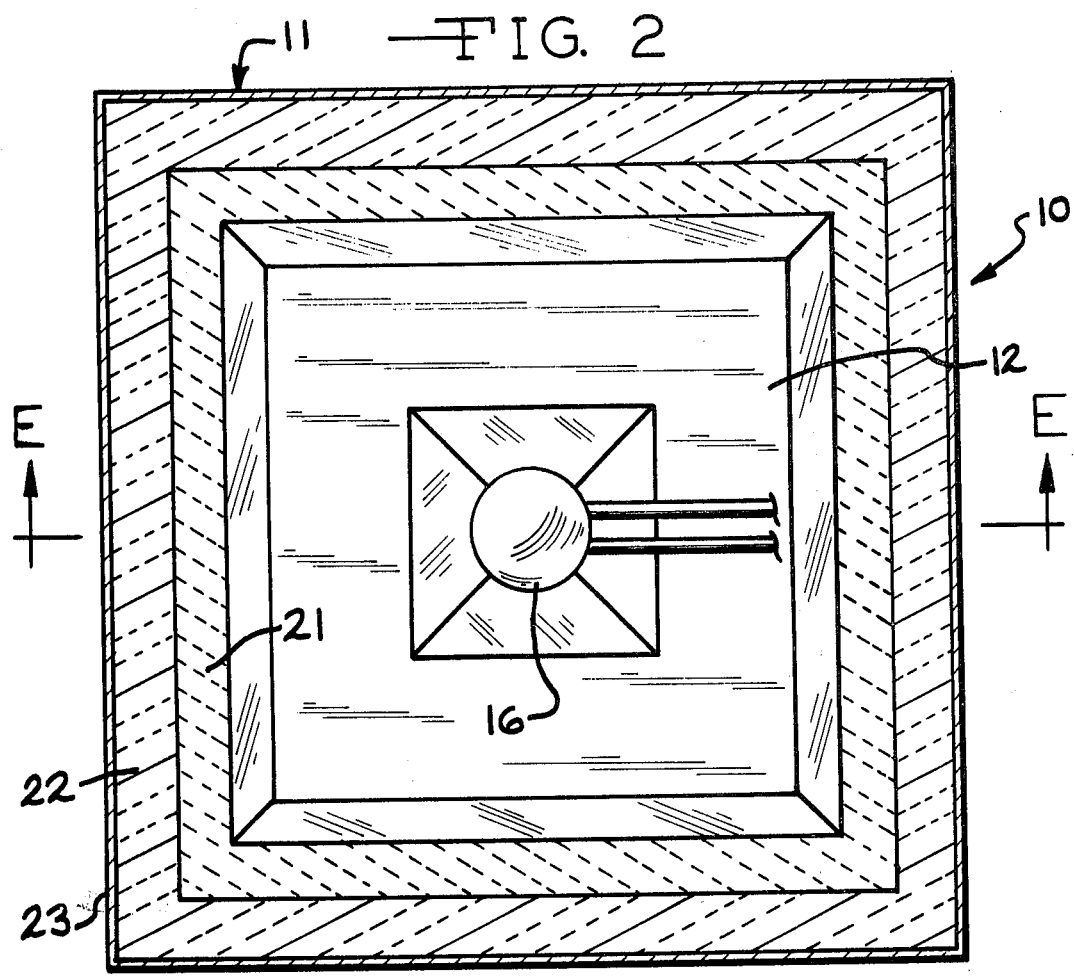
FIG. 2 is a plan view from the top in section through line C—C in FIG. 1.

Referring now to the drawings in which a preferred embodiment is shown, and initially to FIGS. 1 and 2, a solar energy unit 10 is shown as being comprised of a basic longitudinally extending holding frame member 11 having a hollow chamber member 12 therein, a convex magnifying lens 14 and a heat absorbing body 16 in the form of a black body for the preferable embodiment. The magnifying lens 14 is situated at the open end 18 of chamber 12. Generally frame member 11 is in a vertically upright position, so for subsequent reference purposes such end 18 will be referred to as being in the upper end of chamber 12, while the opposite end 19 thereof will be referred to as the lower end. The use of the latter reference system is not to be construed as limiting the orientation of frame 11 to an upright position such that the longitudinal central axis, defined as A—A in FIG. 1 is at all times in the vertical upright position. In this regard, it is intended that the hollow chamber 12 in holding frame 11 will be directed towards the sun at desired intervals in order that axis A—A is aligned towards the sun, with such axis to be parallel with the rays of the sun.

The under-bottom 20 of the bowl shaped holding frame 11 as represented in FIG. 1 may rest on a flat floor or the ground, however, any device for holding it in the desired position of orientation may be used.

The holding frame 11 is preferably a truncated quadrahedron situated in an inverse position so that its smaller end is on the bottom. Frame 11 has a hollow area in its central core, which forms the chamber 12. Immediately adjacent to chamber 12 is a refractory layer 21 structured on all four sides, as well as on the chamber bottom 19. There is preferably a four to five inch thick layer of this refractory material capable of functioning in temperature ranges of five to six thousand degrees Farenheit. Immediately outside and adjacent the refractory layer 21 is a lining of insulating material 22, preferably of the low temperature variety. This lining 22 of insulation has the same conforming configuration as does refractory layer 21, but with lining 21 situated inside lining 22. An outer wall 23 of suitable metallic substance serves as the covering shield for support frame 11.

It is preferable, although not of critical consequence, that the longitudinally extending chamber 12 be configured in the form of a truncated quadrahedron with the smaller end disposed on the lower side, as seen in FIG. 1, and by such configuration the open end 18 of chamber 12 will have a greater girth than the bottom 19 of the said chamber. While the preferred designated embodiment for chamber 12 is that of a truncated quadrahedron, as discussed, the use of a convex magnifying lens 14 imposes no requirement that the chamber 12 be of any particular shape or configuration for purposes of embodying the concepts of this invention. Consequently, a chamber having a parallelopiped form or a curved form, such as the well known parabolic chamber, could also be used, as desired by those who implement this invention.

The magnifying lens 14, as stated above, is preferably of a double convex configuration as represented in the sectional view of FIG. 1. Referring to FIG. 1, the lens 14 is inserted and affixed into the open end 18 of chamber 12 so that its lateral axis B—B lies substantially perpendicular to the longitudinal central axis A—A of Chamber 12. The outer lateral perimeter of lens 14 is shaped for compatible and permanent juxtapositioning into the upper open end 18 of chamber 12 in order that the lens covers the entire opening 18. For purposes of affixing lens 14 into opening 18, a peripheral ledge 25, as seen in FIG. 1, encircles the inner wall of chamber 12 adjacent with upper end 18. The top surface of this ledge 25 is curved and the bottom surface of the lens 14 is affixed to the top surface of the ledge by appropriate epoxy or other bonding methods. However, any method of affixing the lens 14 to the ledge 25 may be used, depending on the weight and material factors involved.

Figure 3:
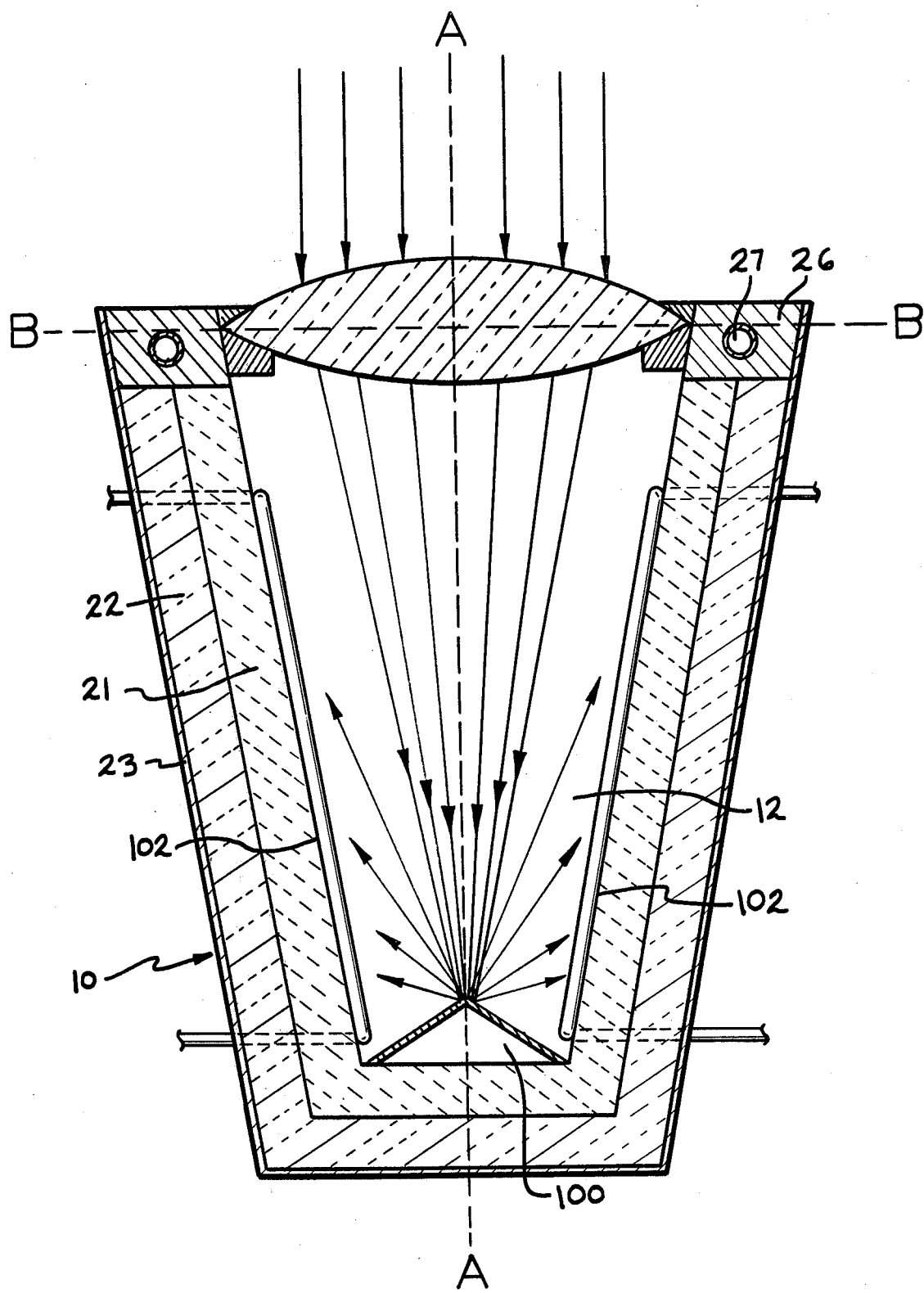
FIG. 3 is a side elevational view of another embodiment of the subject invention, in section through line E—E of FIG. 2.

Located at the top of the supporting frame 11 is a cooling head 26 of toroidal or corresponding shape, which extends around the upper perimeter of frame 11, as depicted in FIG. 1. This cooling head 26 serves to dissipate heat drawn to the top of frame 11 through refractory layer 21 and for this purpose a heat exchanging system is provided in the form of water or air tubing 27 integrated directly through the cooling head, as represented in FIGS. 1 and 3. Thus any heat collected or drawn through the cooling head can be used as an additional input factor into the system to be energized.

Figure 6:
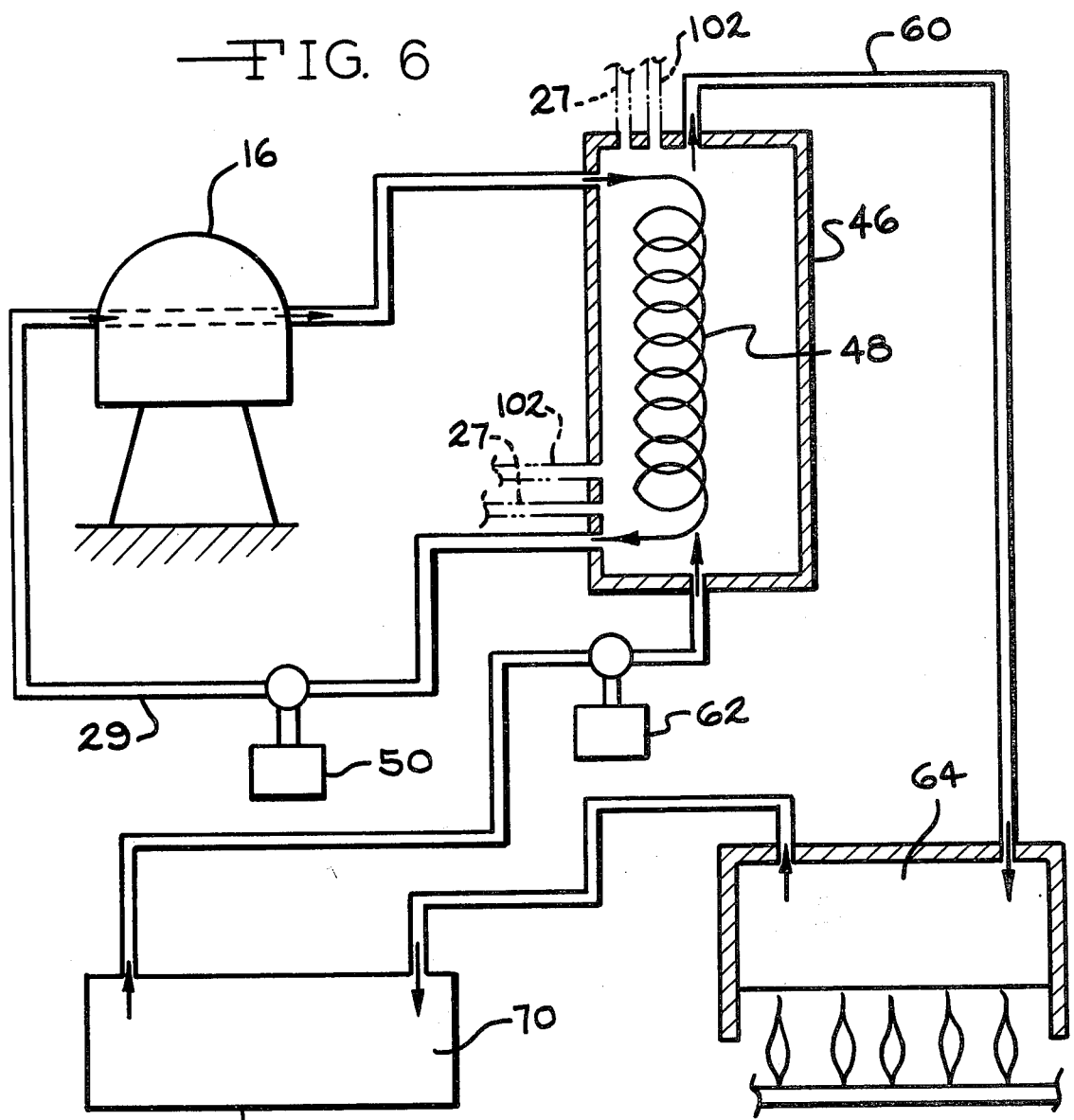
FIG. 6 is a schematic representation of a heat transfer used in conjunction with the subject invention.

The heat absorbing body 16 in the embodiment shown in FIG. 1 located at the lower end of chamber 12 is affixed to the floor 19 of chamber 12 on a metallic stand 28, as represented in FIG. 1. The heat absorbing body shown is preferably hemispherical in shape, with the spherical surface being directed upwardly as the receiving surface for the solar radiation. This receiving surface is made of a black material of highly absorptivity in order to maximize its heat absorbing function. The shape of heat absorbing body is not critical, however, it is found that a rounded, spherical shape may be the most optimal for the embodiment represented in FIG. 1. A heat exchange and withdrawal system in the form of piping 29 is located partially within heat absorbing body 16. Specifically, in the embodiment shown in FIG. 1, piping 29 extends to and from the designated input system, which is analyzed hereinafter, to the heat absorber 16. Air, water or a similar liquid, depending on the compatibility of the input system, is drawn through the piping 29 to absorb collected heat from heat absorbing body 16. This heated air or liquid passes into the specific input system application, as represented in FIG. 6.

Magnifying lens 14 is preferably a double convex lens made of glass, and the exact curvature of this lens will vary depending on the degree of focus desired onto the absorbing body 16. Lens 14 will preferably be approximately three feet in diameter for home utility purposes, however, this dimension is only a recommended size for the preferable embodiment. The exact diameter may be larger or smaller depending on the exact structural and utility needs of the solar heater in question. Furthermore, the thickness of the lens will vary depending upon the exact needs involved.

The function of the lens 14 is to converge the rays of solar radiation impinging upon the upper surface of the lens and to focus the converged rays downwardly into a small zone on the upper spherical surface of the heat absorbing body 16. The converged solar rays as focused on this spherical surface of heat absorbing body produce temperatures in the range of four to six thousand degrees Farenheit.

As an alternative to the convex glass lens, use could be made of a fresnel type lens, which is a thin flat sheet of transparent plastic on which is mounted a plurality of very fine ridges which are molded in concentric circles from the center of the rim. Each such rim is appropriately beveled in order to refract light in the same functional capacity as a conventional convex magnifying lens. Also, a thin plate of glass can be used in this capacity in low temperature applications.

Figure 5:
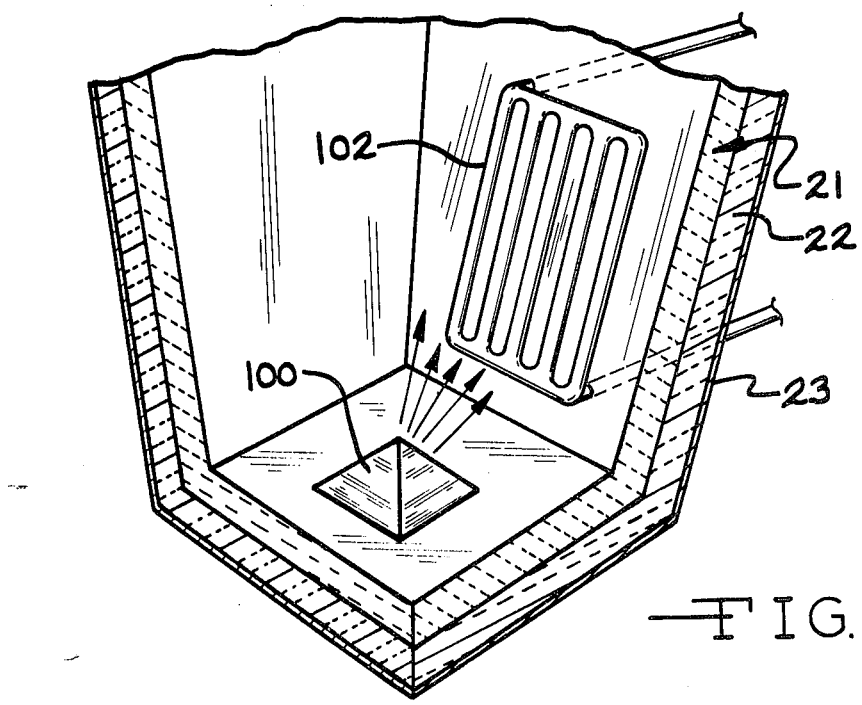
FIG. 5 is a perspective, in section, and partially fragmented view showing the chamber in the embodiment in FIG. 3.

The foregoing description relates to one embodiment of the invention, and there may be other embodiments which the invention can assume. For instance, in the alternative embodiment shown in FIG. 3, a multifaceted reflector member 100 is used at the bottom of chamber 12, as represented, in lieu of a heat absorbing body 16. In this latter embodiment, a four sided quadrahedron or pyramid-shaped member with each side being made of reflecting material forms reflector 100. Also, in this embodiment, conjoined to each surface of refractory lining 21 is a heat exchanger 102 comprised of an open lattice like matrix of black coated piping, as shown in more detail in FIG. 5. In all other respects the embodiment in FIG. 3 has a supporting frame 11, chamber 12, refractory walls 21, insulating wall 22, cooling head 26, and lens 14, which are constructed the same as those in the embodiment shown in FIG. 1.

By using the embodiment shown in FIG. 3, heat focused onto reflector member 100 is reflected to refractory wall 21. This reflected heat will either impinge directly upon heat exchanger 102 or upon the refractory wall 21. In the second alternative embodiment, shown in FIG. 3, the heat that impinges by reflections upon heat exchanger 102 will cause whatever air or liquid therein to be heated. This newly heated air or liquid will then be directed to the connected specific energy input system desired, as represented in FIG. 6. Now, in addition, the heat that does not impinge upon heat exchanger 102 will be directed onto the refractory wall 21 and will cause the refractory material therein to increase in temperature. This heat generated in the refractory wall 21 will rise by conduction upwardly in the refractory wall, along each side of chamber 12, up to the top of the refractory wall where it meets the cooling head 26. The heat in refractory wall will tend to rise upwardly, and this upward conduction movement will be enhanced by the fact that the refractory walls are lined on their outer and bottom peripheries by insulation layer 22, as shown in FIGS. 1 and 3. This insulation layer 22, will help block any conductive heat movement in the direction of layer 22, thus in effect helping the upward conductive movement of heat in layer 21 to cooling head 26. The cooling head 26 will thence, and continuously thereafter, absorb the heat from refractory wall 21 and pass such transferred heat to the heat transfer piping 27 in the cooling head. Thus, both heat exchanger piping 102 and 27 will pass heat into the heat system, as schematically shown in FIG. 6. As indicated by this dual heat collection system there is virtually no heat loss of collected heat, rendering the solar heater highly efficient.

Figure 4:
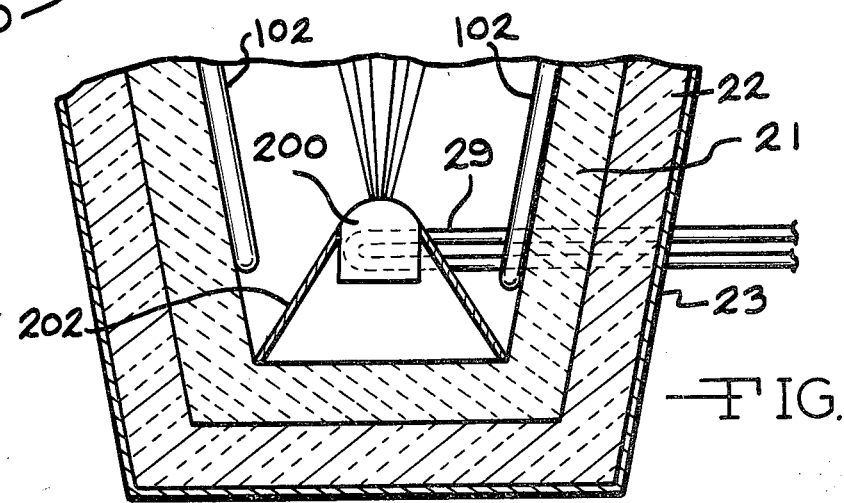
FIG. 4 is a fragmented view in section of an alternate embodiment of the subject invention.

Yet another embodiment of the subject invention is seen in FIG. 4, in which a hemispherical heat absorber 200 is combined with a reflector member 202 having the form of a truncated quadrahedron. Glass or aluminum can be used as the reflector material, since glass has a reflectivity quotient of from 0.53 to 0.89, while aluminum has a quotient range of from 0.72 to 0.96. In all other respects, the chamber 12, the lens 14, the cooling heat 26, and other features of this embodiment are the same as those features of the embodiment shown in FIG. 1. In the case of the embodiment shown in FIG. 4, the absorbing body 200 is equipped with piping 29 incorporated therein, and this latter heat exchanger piping possesses the same attributes as the heat exchanger piping 29 as shown in FIG. 1. Additionally, in the embodiment shown in FIG. 4, the heat exchanger 102 located adjacent the refractory wall 21 is identical in shape and function to the heat exchanger described as used in the embodiment shown in FIG. 3. Reflector member 202 serves to reflect radiation from lens 14 onto the heat exchanger 202 and refractory wall 21, as described before. Thus in operation, the embodiment shown in FIG. 4, has a threefold heat collector and retention system and corresponding apparatus. Specifically, when heat impinges upon the exposed black hemispherical surface of heat absorbing body 200, such heat will pass through its heat exchanging system to pipes 29. This heat in the form of hot water will travel directly to the second heat exchanger shown in FIG. 6. If air is used in pipes 29, a second heat exchanger may be rendered unnecessary. Any minimal heat reflected off heat absorbing body 200 and additionally any radiation reflected off reflector member 202 will be directed onto heat exchanger 102, identical to the one shown in the embodiment represented in FIG. 3, and which heat exchanger will be heated proportionately and pass its heat through its pipes as a second heat receipt source into the heat input system shown in FIG. 6. Now, as a third collection and retention source and mechanism, heat absorbed through the cooling head 26, from refractory wall 21 will pass to pipes 27 on to the heat input system. As can be determined this threefold heat collection system, it insures a maximization of heat collection and retention in the subject device. Moreover, using a vacuum in chamber 12 will further increase this efficiency to a level approaching perfect efficiency of operation.

A heat exchange system as represented schematically in FIg. 6 is employed in conjunction with the solar heating system, and may be used with any of the embodiment discussed above. This system is representative only and is set forth as an example of one possible combination that may be used in conjunction with the subject invention. Other systems can be so used. Specifically piping 29 as directed through absorbing body 16 is designed to hold water or air under relatively high temperature conditions, as the heat flow to be transferred from absorbing body 16 will be substantial in view of the fact that temperatures in the vicinity of 5000° F. will be generated on absorbing body 16. Pipes 29 lead to storage tank 46 containing therein an additional heat exchange unit 48 therein. Centrifugal pump 50 serves to pump the water or air through the piping 26, so as to cause it to circulate through the absorbing body 26. The heat exchanger 48 in tank 46 serves to transfer the heat from the water in piping 26 to hot air, as an example of the possible end use of the solar radiation captured. Furthermore, heat from the fluids coming from heat exchangers 27 and 102, for the embodiments shown in FIGS. 3 and 4 can be drawn into the systems shown in FIG. 6 to augment its total effect.

As can be ascertained from the foregoing description, the operation the subject invention serves not only to maximize the capture of the sun's radiant energy but also maximizes the retention process relative to such heat collected. By the combination of the reflector systems with the heat absorbers, the refractory wall, and the sundry heat exchangers, the efficiency of the device is maximized. It must be remembered, as indicated hereinabove for the ideal paraboloid of one hundred percent efficiency operating in space, the temperature of a black body therein would reach approximately ten thousand degrees Farenheit maximum. However, since most surfaces are not perfect reflectors, and since the atmosphere reduces incident radiation of the sun, the resultant highest reported temperatures of parabolic reflectors is in the vicinity of 4000°–6000° F. But, the problem with such reflectors has been that while hot temperatures have been generated, total heat accumulated and retention problem is not solved.

This invention resolves the heat retention problem considerably by the multifold heat absorption and transfer mechanisms employed, as described.

In a solar concentrator of the convex lens type herein described or the parabolic bowl type, it may be desirable, but not always necessary, for a continuous tracking of the solar device directly into the sun's rays. In other words, it may be feasible to have the solar concentrator maneuvered periodically to receive the sun's rays directly onto the collector. Relative to the embodiments shown in FIGS. 1, 3, and 4, this requirement means that the axis A—A be aligned directly parallel to the existant axial direction of the sun's rays at a given time interval. Indeed, the tracking function may be complex process by which appropriate mechanical or electronic equipment is needed to track the collector into the sun's rays. It is beyond the scope herein to discuss in any detail a specific tracking system, however it is sufficient to state that mechanical means can be appended to each solar furnace in order to track the same as aforementioned. Another possibility in this regard, would entail the use of a simple mirror system which does not move into the sun and reflect same back onto the receiving surface of the fixed solar collector.

Thus, in this latter methodology, a large flat plane mirror is utilized to track the sun and reflect its rays into the parabolic concentrator, however, if this auxiliary system is used, the surface of the plane mirror must be of greater area than the parabolic receptacles.

While the foregoing description details specific embodiments, it is not to be construed as a limitation on the scope of the invention set forth in the following claims.

I claim:

1. A solar radiation collector comprising in combination:
   (a) a hollow chamber having an open end and an enclosed end, said hollow chamber being adapted to receive solar radiation through said open end;
   (b) magnifying lens located in the open end of said chamber, said magnifying lens being adapted to receive solar radiation therethrough and focus said solar radiation into said chamber;

(c) refractive means lining the inner surface of said hollow chamber;

(d) means located in said hollow chamber to reflect the solar radiation received into said chamber onto the refractive means;

(e) heat exchange means adjacent said refractive means.

2. A solar radiation converter comprising in combination:

(a) a hollow chambered frame having an opening at one end thereof to receive radiation from the sun;

(b) transparent means affixed to said open end of said hollow chambered frame so as to encompass said open end and to receive and focus radiation passing into the open end of said chamber;

(c) radiation heat absorbing means located inside said chamber to receive the focused solar radiation;

(d) first heat transfer means located in said chamber adjacent said radiation heat absorbing means;

(e) refractory lining disposed over the inner walls of said chamber;

(f) reflector means in said chamber and juxtaposed with the radiation heat absorbing means to reflect radiation to the refractory lining;

(g) cooling means disposed at adjacent said refractory lining to absorb heat conducted to the top of said refractory lining;

(h) second heat transfer means adjoining said cooling means.

3. A solar radiation energy concentrator adapted to receive and convert solar energy comprising in combination:

(a) a frame member having a hollow chamber therein, said frame member having an opening communicating the chamber with the outside by which said opening is adapted to receive solar radiation therethrough;

(b) means affixed in the open end of said frame to focus any solar radiation passing through said chamber;

(c) radiation heat absorbing means in the chamber of said frame member adapted to absorb said radiation heat;

(d) first heat exchanger means juxtaposed with said radiation heat absorbing means;

(e) refractory lining on the inner walls of the chamber of said frame;

(f) reflective means located adjacent said radiation heat absorbing means so as to reflect any radiation heat received thereon onto said refractory lining;

(g) cooling means located adjacent said refractory lining to receive conductive heat from said refractory lining, and incident radiation from said reflector means;

(h) second heat transfer means juxtaposed with said cooling means.

* * * * *